United States Patent [19]

Minagawa et al.

[11] 4,105,625
[45] Aug. 8, 1978

[54] 2,2,6,6-TETRAMETHYL-4-PIPERIDYL CARBOXYLIC ACID ESTERS OF HYDROXY ALIPHATIC DI- AND TRI-CARBOXYLIC ACIDS AS LIGHT STABILIZERS FOR SYNTHETIC POLYMERS

[75] Inventors: Motonobu Minagawa, Kosigaya; Naohiro Kubota; Toshihiro Shibata, both of Urawa, all of Japan

[73] Assignee: Argus Chemical Corporation, Brooklyn, N.Y.

[21] Appl. No.: 770,475

[22] Filed: Feb. 22, 1977

[30] Foreign Application Priority Data

Mar. 19, 1976 [JP] Japan .................................. 51/30349

[51] Int. Cl.² .......................... C08K 5/34; C07D 211/06
[52] U.S. Cl. ............................ 260/45.8 N; 260/293.57; 260/293.63
[58] Field of Search .................... 260/45.8 N, 293.63, 260/293.57; 526/119

[56] References Cited
U.S. PATENT DOCUMENTS

| 3,899,464 | 8/1975 | Murayama et al. | 260/45.8 N |
| 4,021,432 | 5/1977 | Holt et al. | 260/45.8 N |

*Primary Examiner*—V. P. Hoke

[57] ABSTRACT

2,2,6,6-tetramethyl-4-piperidyl carboxylic acid esters of aliphatic di- or tri- carboxylic acids are provided, useful as light stabilizers for organic polymeric materials, and having the general formula:

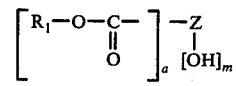

wherein:
$R_1$ is selected from the group consisting of

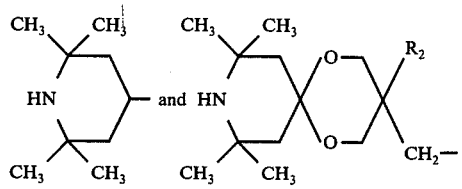

$R_2$ is $CH_3$ or $C_2H_5$;
a is selected from the group consisting of 2 and 3;
m is selected from the group consisting of 1, 2, 3 and 4; and
Z is a divalent ot trivalent aliphatic radical carrying from two to three

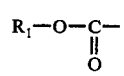

groups, and can include from one to four hydroxyl groups OH.

24 Claims, No Drawings

2,2,6,6-TETRAMETHYL-4-PIPERIDYL CARBOXYLIC ACID ESTERS OF HYDROXY ALIPHATIC DI- AND TRI-CARBOXYLIC ACIDS AS LIGHT STABILIZERS FOR SYNTHETIC POLYMERS

Hindered 2,2,6,6-tetraalkyl-4-carboxylic acid ester piperidine compounds have been proposed by Murayama et al U.S. Pat. No. 3,640,928 patented Feb. 8, 1972 as light and heat stabilizers for synthetic polymers, such as polyolefins, polyvinyl chloride, polyvinylidene chloride, polyurethanes, and polyamides. These compounds have the general formula:

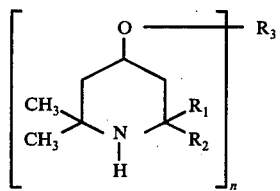

or a salt thereof.

In the above Formula:

$R_1$ and $R_2$ which may be the same or different, each are an alkyl group such as methyl, ethyl, isopropyl or dodecyl, or they form, together with the carbon atom to which they are attached, a saturated alicyclic group such as:

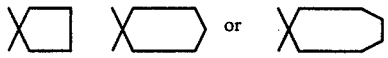

or a group of the formula

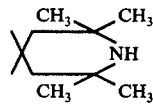

$n$ is an integer of 1 to 3 inclusive: and
$R_3$ is an acyl group.

These compounds have proved to be particularly acceptable because they do not impart a discoloration of their own to the synthetic polymer. The compounds generally employed previously have either been highly colored, such as the nickel compounds (which are normally green) and the 2-hydroxybenzophenones (which are varying shades and intensities of yellow). They also show very little tendency towards sublimation and exudation, and they have an excellent stabilizing action against both heat and light deterioration.

Consequently, the Murayama et al patent has been followed by a large number of patent and literature disclosures by Murayama et al and others of compounds including a 2,2,6,6-tetrasubstituted-4-piperidyl group attached to a base molecule of varying structures.

Murayama et al U.S. Pat. No. 3,898,303 patented Aug. 5, 1975 propose piperidino-spiro-hydantoin derivatives having the formula:

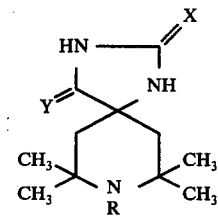

wherein

R represents an alkyl group, an alkenyl group, an alkenoyl group which may be substituted with an aryl group, a hydroxyalkyl group, an alkoxyalkyl group, an alkoxycarbonylalkyl group, an acyloxyalkyl group, a cyanoalkyl group or nitroso group, and X and Y individually represent oxygen atom or sulfur atom.

Murayama et al in U.S. Pat. No. 3,899,464 patented Aug. 12, 1975 disclose a variation of the piperidino spiro compounds having the formula:

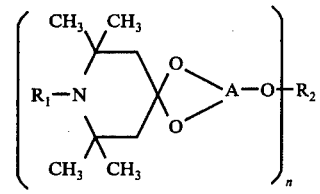

wherein $R_1$ represents hydrogen atom, an alkyl group, a substituted alkyl group, an alkenyl group, an alkynyl group, a substituted or unsubstituted aralkyl group, an aliphatic acyl group, an alkoxycarbonyl group or an aralkoxycarbonyl group, $n$ is an integer of 1 to 4;

when $n$ is 1, $R_2$ represents hydrogen atom, an aliphatic, aromatic or heterocyclic monoacyl group, an alkyl group, an alkenyl group, an alkynyl group, an aralkyl group, an aryl group, an alkoxyalkyl group, an epoxyalkyl group, an alkoxysulfonylalkyl group, N-substituted carbamoyl group, a N-substituted thiocarbamoyl group, a monovalent group from an oxoacid or group

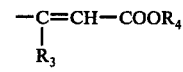

in which $R_3$ represents hydrogen atom, a lower alkyl group or phenyl group and $R_4$ represents an alkyl group;

when $n$ is 2, $R_2$ represents carbonyl group, an aliphatic or aromatic diacyl group, an alkylene group, an alkenylene group, an alkynylene group, an aralkylene group, a N-substituted dicarbamoyl group or a divalent group from an oxoacid;

when $n$ is 3, $R_2$ represents an aromatic triacyl group or a trivalent group from an oxoacid; and when $n$ is 4, $R_2$ represents an aromatic tetraacyl group, and A represents a group

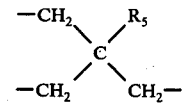

in which

R₅ represents hydrogen atom or a lower alkyl group or, when n is 1, R₅ may represent together with R₂ a group

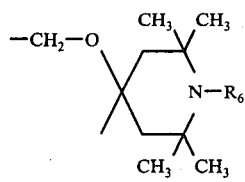

in which

R₆ represents the same group as defined in R₁ and may be the same or different from R₁, or a group

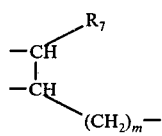

in which m is 1 or 2 and R₇ represents hydrogen atom or, when n and m are 1, R₇ represents methylene group together with R₂.

Murayama et al U.S. Pat. No. 3,933,735 patented Jan. 20, 1976 propose 4-piperiodone derivatives having a structure similar to the 4-piperidyl derivatives, but with a keto oxygen at the 4-position of the piperidine ring.

Murayama et al U.S. Pat. No. 3,941,744 patented Mar. 2, 1976, disclose another variation of the piperidino spiro derivatives having the formula:

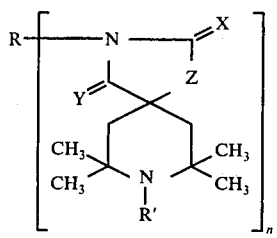

wherein

R' represents an alkyl group, a substituted alkyl group, an acyl group, an alkoxycarbonyl group, a substituted alkoxycarbonyl group, an amino group, a substituted amino group or nitroso group;

X represents oxygen atom or sulfur atom;

Y represents oxygen atom, sulfur atom or a group of the formula =N—R" in which R" is hydrogen atom, an alkyl group or a substituted alkyl group;

Z represents oxygen atom or a group of the formula >N—R''' is hydrogen atom, an alkyl group or a substituted alkyl group;

n is an integer of 1 through 4 inclusive; and

R represents, when n is 1, an alkyl group, a substituted alkyl group, an aryl group, a substituted aryl group, a cycloalkyl group, an alkoxycarbonyl group, a substituted alkoxycarbonyl group, a substituted phosphino group or a substituted phosphinyl group, when n is 2, an alkylene group, an alkenylene group, an arylene group, a substituted arylene group, an aralkylene group, an alkylenediphenylene group, a bis-(acyloxyalkylene) group, an alkylene-bis-(oxycarbonylalkyl) group, a dialkylene ether group or a diphenylene ether group, when n is 3, an alkanetriyl group, a tris-(acyloxyalkyklene) group, an alkane-tris-(oxycarbonylalkyl) group or a group of the group

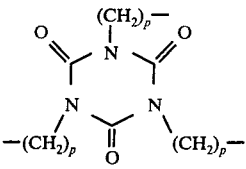

in which p is an integer of 1 through 8 inclusive, and when n is 4, an alkane tetrayl group, a tetrakis-(acyloxyalkylene) group or an alkanetetrakis(oxycarbonylalkyl) group.

Murayama et al U.S. Pat. No. 3,940,363 patented Feb. 24, 1976 disclose a further variation in which two 2,2,6,6-tetrasubstituted-4-piperidyl groups are linked together via the ring nitrogen atom to an R' alkylene linking group, which may be interrupted with an oxygen or sulfur atom, an alkenylene group, an alkynylene group, an aralkylene group, an aliphatic diacyl group, a group having the formula:

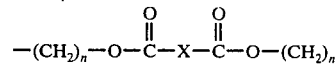

in which n is an integer of 1 or 2 and X is an alkylene group, or o-, m- or p-phenylene group or the carbon atoms of CO groups may be directly joined in the absence of X or a group of the formula:

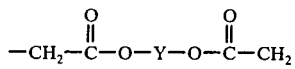

in which

Y is an alkylene group or o-, m- or p-phenylene group.

Ramey et al U.S. Pat. No. 3,899,491, patented Aug. 12, 1975 and U.S. Pat. No. 3,920,659, patented Nov. 18, 1975, disclose alkyl alkanoate derivatives of substituted piperazines and substituted piperazinodiones. The substituted piperazines of U.S. Pat. No. 3,899,491 have the formula:

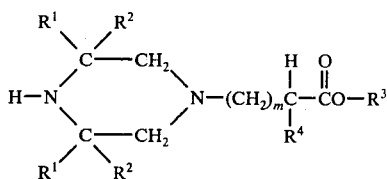

wherein

R¹ and R² are methyl or together with the carbon to which they are bound form a mono-cyclic ring system having five or six carbon atoms;

R³ is an alkyl group of from one to twenty atoms;

R⁴ is hydrogen or methyl, and m is 0 or 1.

The substituted piperazinodiones of U.S. Pat. No. 3,920,659 have the formula:

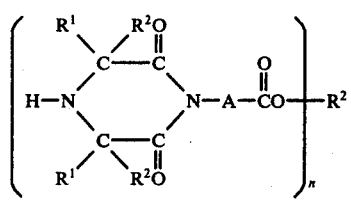

wherein $R^1$ and $R^2$ are independently of each other methyl or ethyl or together with the carbon to which they are bound form a cyclopentyl or cyclohexyl ring, which is unsubstituted or substituted with a methyl group;

n is an integer of from 1 to 2;

when n is 1, $R^3$ is an alkyl group of from one to twenty carbon atoms;

when n is 2, $R^3$ is an alkylene group of from two to eight carbon atoms; and

A is a straight or branched chain (lower) alkylene group containing from one to six carbon atoms with the limitation that the terminals of said alkylene group bear only hydrogen or one (lower) alkyl group.

Ramey et al U.S. Pat. No. 3,920,661 patented Nov. 18, 1975 disclose dicarboxylic acids and salts in which one carboxylic acid group is esterified with a 2,2,6,6-tetrasubstituted-4-hydroxy piperidine and having the formula:

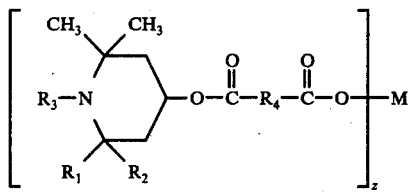

wherein $R_1$ and $R_2$ independently of each other are straight- or branched-chain alkyl having from one to six carbon atoms, or together with the carbon to which they are bound form a cyclopentyl or cyclohexyl ring, which is unsubstituted or substituted with a methyl group;

$R_3$ is hydrogen, alkyl having one to twelve carbon atoms, β-methoxyethyl, alkenyl having three or four carbon atoms, propargyl, benzyl or alkyl-substituted benzyl;

$R_4$ is straight or branched-chain alkylene having five to eight carbon atoms, or the group $(CH_2)_m Y(CH_2)_n$ wherein Y is oxygen or sulfur and m and n independently of each other are an integer from 1 to 3;

M is hydrogen or a metal selected from the group consisting of barium, nickel, manganese, calcium, zinc, iron, sodium, cobalt, tin, and dialkyl tin, and z has a value of from 1 to 4, the value of z being the same as the available valence of M.

Ramey et al U.S. Pat. No. 3,939,163 patented Feb. 17, 1976 disclose closely similar compounds in which $R_4$ is alkylene having from one to four carbon atoms.

Randell et al U.S. Pat. No. 3,939,170 patented Feb. 17, 1976 disclose dehydropyridinyl sulphides, sulphoxides and sulphones having the formula:

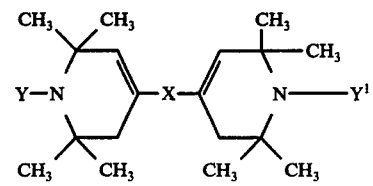

wherein

X is S, SO or $SO_2$ and Y and $Y^1$ are the same or different and each is H, OH, O- or a straight- or branched alkyl residue having from one to four carbon atoms, and salts thereof when Y and $Y^1$ are other than O—

Randell et al in published patent application No. B408,123 published Apr. 13, 1976 disclose substituted piperidine-4-ols having the formula:

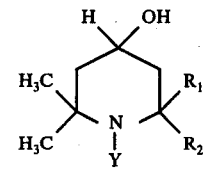

wherein $R_1$ and $R_2$ are the same or different and each is a straight- or branched alkyl residue having from one to twelve carbon atoms, or $R_1$ and $R_2$, together with the carbon atom to which they are attached, form a cycloalkyl residue having from five to twelve carbon atoms or the group:

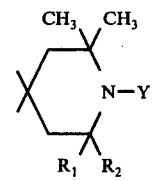

wherein $R_1$ and $R_2$ have their previous significance and Y is a straight- or branched alkyl residue having from one to twenty carbon atoms, an alkenyl or alkynyl residue having from three to twenty carbon atoms, an aralkyl residue having from seven to twelve carbon atoms or the group —$CH_2X$ wherein X is the group

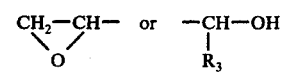

wherein $R_3$ is hydrogen, a methyl or phenyl residue, the group

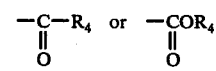

wherein $R_4$ is an alkyl residue having from one to twenty carbon atoms.

Cook U.S. Pat. No. 3,929,804 patented Dec. 30, 1975 discloses 4-piperidine acetamide compounds having the formula:

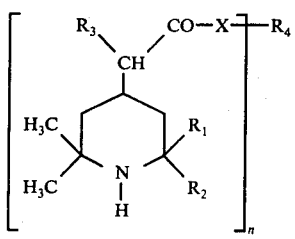

wherein $R_1$ and $R_2$ are the same or different and each is a straight- or branched alkyl residue having from one to twelve carbon atoms, or $R_1$ and $R_2$, together with the carbon atom to which they are attached form a cycloalkyl group having from five to twelve carbon atoms;

$R_3$ is hydrogen, a straight- or branched alkyl residue having from one to four carbon atoms, an aralkyl residue having from seven to nine carbon atoms or a cycloalkyl group having from five or six carbon atoms;

$R_4$ is a metal ion or a hydrocarbyl residue having from two to twenty carbon atoms and being either unsubstituted or substituted by halogen or interrupted by one or more oxygen or sulphur atoms;

X is —O—, —S—, or >$NR_5$, wherein $R_5$ has the same significance as $R_3$; and n is 2, 3 or 4; as well as salts of the amine function of the compounds of formula I.

Cook U.S. Pat. No. 3,939,168 patented Feb. 17, 1976 discloses closely similar compounds having a Y substituent on the piperidyl nitrogen atom, Y being alkyl, alkenyl, aralkyl or a group

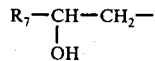

wherein $R_7$ is hydrogen, alkyl or phenyl.

In accordance with the instant invention, 2,2,6,6-tetramethyl-4-piperidyl carboxylic acid esters of aliphatic di- or tri- carboxylic acids are provided, useful as stabilizers for organic polymeric materials, and having the general formula:

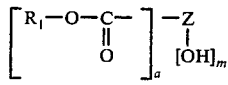

wherein:

$R_1$ is selected from the group consisting of

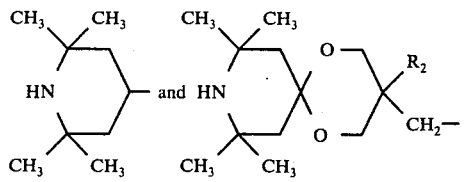

$R_2$ is $CH_3$ or $C_2H_5$;

a is selected from the group consisting of 2 and 3;

m is selected from the group consisting of 1, 2, 3 and 4; and z is a divalent or trivalent aliphatic radical carrying from two to three

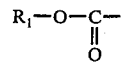

groups, and can include from one to four hydroxyl groups OH.

The z aliphatic radical has from two to about eight carbon atoms in a straight or branched saturated or ethylenically unsaturated chain, with from one to four hydroxyl groups. Exemplary are ethylene, propylene, butylene, pentylene, hexylene, and octylene.

The z radical is derived from a hydroxy substituted di- or tri-carboxylic aliphatic acid, of which the following are illustrative: tartaric acid, tartronic acid, malic acid, dihydroxy-tartaric acid, citric acid, 4-hydroxy-1,2,3-butane-tricarboxylic acid, citramalic acid, trihydroxy glutaric acid, tetrahydroxy adipic acid, mucic acid, saccharic acid, mannosaccharic acid, idosaccharic acid, and talomucic acid.

The following compounds are exemplary:

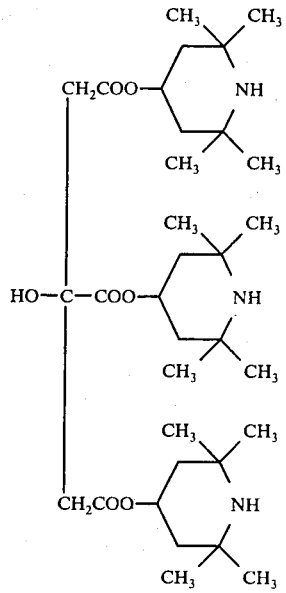

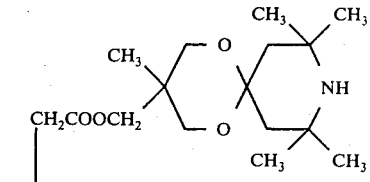

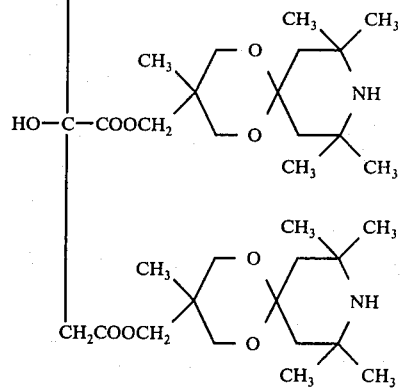

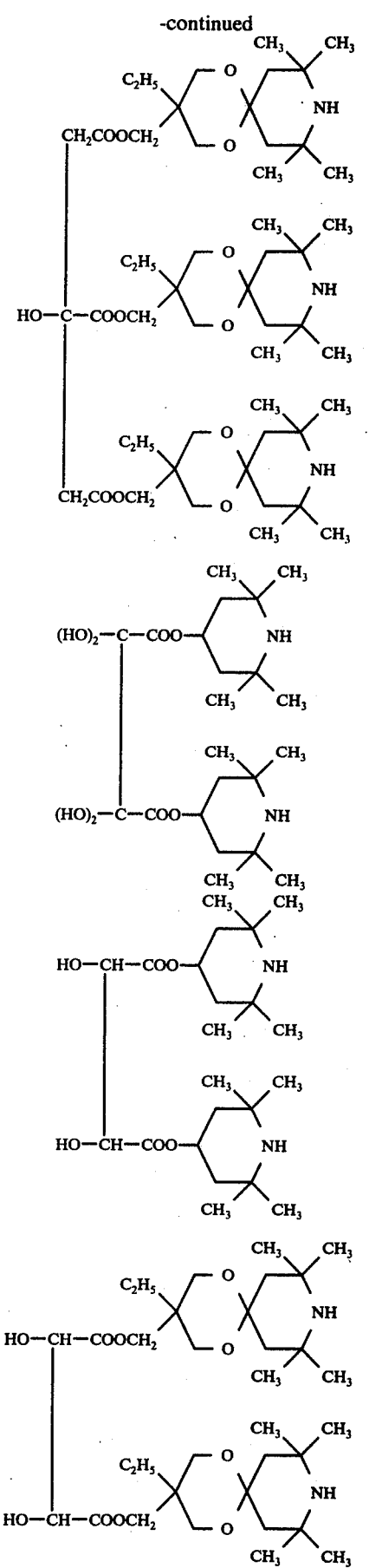

3.

4.

5.

6.

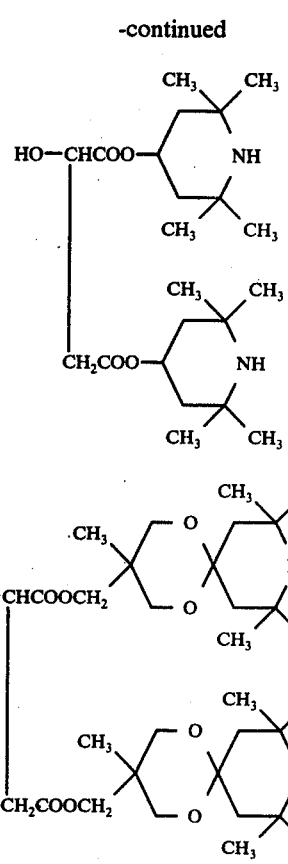

7.

8.

The compounds in accordance with the invention are readily prepared using conventional procedures. The starting materials are either available or readily synthesized without difficulty. The corresponding 2,2,6,6-tetrasubstituted-4-hydroxy piperidine is used as a starting material for the 2,2,6,6-tetrasubstituted-4-piperidyl group $R_1$. This is reacted in the presence of an organic solvent and an alkali metal alkoxide with one or more free carboxylic acid groups of the corresponding di or tricarboxylic acid or ester containing two or three free or lower alkyl- or aryl-esterified carboxylic acid groups. The hydroxy group of the piperidine becomes esterified with the carboxylic acid groups, displacing any esterifying radicals, and forming the 4-piperidyl carboxylic acid ester of the invention:

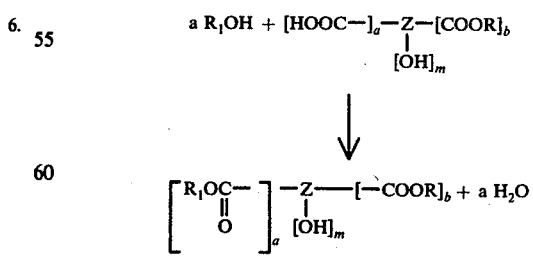

EXAMPLE 1

Preparation of

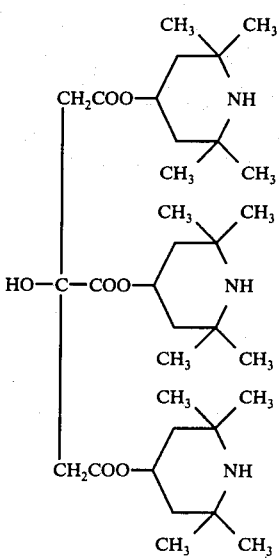

7.5 g (0.03 mole) of trimethyl citrate, 17.5 g (0.11 mole of 2,2,6,6-tetramethylpiperidine-4-ol and 0.5 ml of titanium tetraisopropoxide were added to 60 ml of xylene.

The solution was heated and stirred for seven hours at 140° C, while distilling off the methanol as it was liberated. After cooling, the solution was filtered, and 100 ml of ethyl ether was added to the filtrate. White crystals m.p. 105 to 107° C, 7.0 g were obtained by recrystallization of the extract from n-hexane.

The product was shown by infrared analysis to have $\gamma$ NH = 3260 cm$^{-1}$
$\gamma$ C—O = 1160 cm$^{-1}$
$\gamma$ C=O = 1725 cm$^{-1}$

| Elemental analysis: | C% | H% | N% |
|---|---|---|---|
| Calculated | 63.16 | 8.93 | 6.70 |
| Found | 62.95 | 9.06 | 6.62 |

The compound thus corresponded to the formula shown above.

The 2,2,6,6-tetrasubstituted-4-piperidyl carboxylic acid esters of the invention are effective stabilizers to enhance the resistance to deterioration due to heat and-/or light of synthetic polymeric materials which are susceptible to such degradation, including polyolefins such as low density polyethylene, high density polyethylene, polypropylene, polybutylene, polyisobutylene, polypentylene, and polyisopentylene, polystyrene; polydienes, such as polybutadiene and polyisoprene; and copolymers of olefins and dienes with other ethylenically and acetylenically unsaturated monomers, such as ethylene-propylene copolymers, ethylene-butene copolymers, ethylene-pentene copolymers, ethylene-vinyl acetate copolymers, styrene-butadiene copolymers, acrylonitrile-styrene-butadiene copolymers, synthetic rubbers of all types, such as polychloroprene; polyvinyl halides, including polyvinyl chloride homopolymer, polyvinylidene chloride; and copolymers of vinyl chloride and vinylidene chloride; vinyl chloride and vinyl acetate; vinylidene chloride and vinyl acetate; and other ethylenically unsaturated monomers; polyacetals such as polyoxymethylene and polyoxyethylene; polyesters such as polyethylene glycol-terephthalic acid ester polymers; polyamides such as polyepsiloncaprolactam; polyhexamethylene adipamide and polydecamethylene adipamide; polyurethanes; and epoxy resins.

The synthetic polymer can be in any physical form, including (for example) filaments, yarns, films, sheets, molded articles, latex, and foam.

The stabilizers of the invention can be employed as the sole stabilizer or, preferably, in combination with other conventional heat and light stabilizers for the particular synthetic polymer.

Thus, for example, in the case of polyvinyl chloride resins, other polyvinyl chloride resin heat stabilizers can be included, including polyvalent metal fatty acid salts such as barium and cadmium salts of the higher fatty acids; organic triphosphites; organotin compounds; hindered phenols; and epoxy compounds.

With polyolefin resins there can be employed fatty acids salts of polyvalent metals, organic phosphites, phenolic antioxidants, and the higher fatty acid esters of thiodipropionic acids, such as, for example, dilauryl thiodipropionate.

With polyamide resin compositions, polyamide stabilizers such as copper salts in combination with iodides and/or phosphorous compounds and salts of divalent manganese can be used.

With synthetic rubbers and acrylonitrile butadiene styrene terpolymers, antioxidants such as hindered phenols and bis-phenols, polyvalent metal salts of the higher fatty acids, and organic phosphites can be used.

In addition, other conventional additives for synthetic polymers, such as plasticizers, lubricants, emulsifiers, antistatic agents, flame-proofing agents, pigments and fillers, can be employed.

EXAMPLES 1 to 6

A group of polyvinyl chloride resin compositions were prepared, having the following formulation:

| Ingredient | Parts by Weight |
|---|---|
| Polyvinyl chloride | 100 |
| Dioctyl phthalate | 48 |
| Epoxydized soyabean oil | 2 |
| Tris (nonylphenyl) phosphite | 0.2 |
| Ca stearate | 1.0 |
| Zn stearate | 0.1 |
| Stabilizer as shown in Table I | 0.2 |

This formulation was blended, and sheeted off on a two-roll mill to form sheets 1 mm thick. The color of these sheets was observed, and the light resistance of these sheets was then determined by placing strips 1 cm long in a Weather-O-Meter, and exposing them to ultraviolet light. The time in hours was then noted for the sheets to develop a noticeable discoloration and/or embrittlement, indicating deterioration due to oxidation in the presence of ultraviolet light. The time is reported as hours to failure, and the color was also noted at this time.

The following results were obtained:

TABLE I

| Example No. | Stabilizer | Hours to Failure | Color |
|---|---|---|---|
| Control 1 | 2-hydroxy-4-methoxybenzophenone | 340 | Pale yellow |
| Control 2 | Bis (2,2,6,6-tetramethyl-4-piperidinyl)sebacate | 290 | Colorless |
| 1. | [structure: central carbon with three branches — CH$_2$COO–(2,2,6,6-tetramethylpiperidin-4-yl), HO–C–COO–(2,2,6,6-tetramethylpiperidin-4-yl), CH$_2$COO–(2,2,6,6-tetramethylpiperidin-4-yl)] | 520 | Colorless |
| 2. | [structure: central carbon with three branches — C$_2$H$_5$/CH$_2$COOCH$_2$–(cyclic ketal linked to 2,2,6,6-tetramethylpiperidinyl), HO–C–COOCH$_2$ with C$_2$H$_5$ and ketal-piperidinyl group, CH$_2$COOCH$_2$ with C$_2$H$_5$ and ketal-piperidinyl group] | 480 | Colorless |
| 3. | [structure: two branches — (HO)$_2$–C–COO–(2,2,6,6-tetramethylpiperidin-4-yl), (HO)$_2$–C–COO–(2,2,6,6-tetramethylpiperidin-4-yl)] | 450 | Colorless |

TABLE I-continued

| Example No. | Stabilizer | Hours to Failure | Color |
|---|---|---|---|
| 4. | HO—CH—COO—[2,2,6,6-tetramethylpiperidin-4-yl] / HO—CH—COO—[2,2,6,6-tetramethylpiperidin-4-yl] (linked) | 500 | Colorless |
| 5. | HO—CH($C_2H_5$)—COOCH$_2$—[3-ethyl-1,5-dioxa-spiro linked to 2,2,6,6-tetramethylpiperidine] / HO—CH($C_2H_5$)—COOCH$_2$—[same spiro-piperidine] | 490 | Colorless |
| 6. | HO—CHCOOCH$_2$—[3-methyl-1,5-dioxa-spiro linked to 2,2,6,6-tetramethylpiperidine]; CH$_3$ / CH$_2$COOCH$_2$—[3-methyl-1,5-dioxa-spiro linked to 2,2,6,6-tetramethylpiperidine] | 460 | Colorless |

The stabilizers of the invention are clearly superior to the controls.

EXAMPLES 7 to 12

A group of polypropylene compositions was prepared, using stabilizers of the invention and of prior art, and having the following formulation:

| Ingredient | Parts by Weight |
|---|---|
| Polypropylene | 100 |
| Dilaurylthiodipropionate | 0.3 |
| Stearyl-β-(3,5-di-t-butyl-4-hydroxy phenyl propionate | 0.1 |
| Distearyl pentaerythritol diphosphite | 0.1 |
| Stabilizer as shown in Table II | 0.3 |

The composition was blended and then compression-molded to form sheets 0.5 mm thick. Pieces 2.5 cm square were cut off from the sheets, and exposed to ultraviolet light in a Weather-O-Meter for 350 hours. At the start and at the conclusion of the test, the elongation of the sheet samples was determined. The results are given in Table II as % retention of the initially determined elongation.

TABLE II

| Example No. | Stabilizer | % Retention of Elongation after 350 hours |
|---|---|---|
| Control 1 | 2(2'-hydroxy-5'-chlorophenyl) benzotriazole | 20.3 |
| Control 2 | Tris (2,2,6,6-tetramethyl-4-piperidinyl) propane tricarboxylate | 32.5 |
| Control 3 | Bis (9-aza-3-ethyl-8,8,10,10-tetramethyl-1,5-dioxa-spiro[5,5]-3-undecyl methyl) adipate | 20.2 |

TABLE II-continued
| Example No. | Stabilizer | % Retention of Elongation after 350 hours |
|---|---|---|
| 7. | 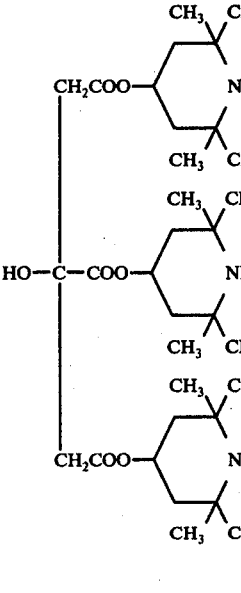 | 64.7 |
| 8. | 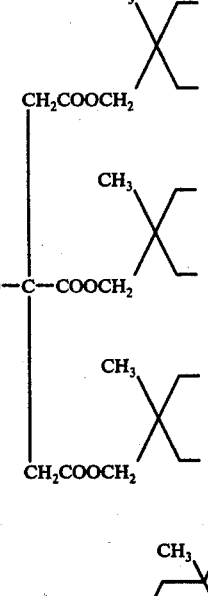 | 60.3 |
| 9. | 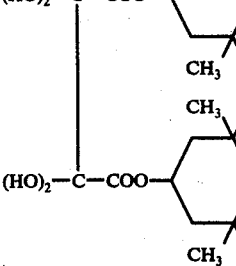 | 55.6 |

TABLE II-continued

| Example No. | Stabilizer | % Retention of Elongation after 350 hours |
|---|---|---|
| 10. | (bis-structure: HO—CH—COOCH$_2$ / HO—CH—COOCH$_2$ linked, each ester group attached to a spiro dioxa group with C$_2$H$_5$ substituent, connected to 2,2,6,6-tetramethylpiperidinyl-NH) | 58.0 |
| 11. | HO—CHCOO— and CH$_2$COO— both linked to 2,2,6,6-tetramethyl-4-piperidinyl (NH) groups | 62.1 |
| 12. | HO—CHCOOCH$_2$ and CH$_2$COOCH$_2$ linked to spiro dioxa groups with CH$_3$ substituent, connected to 2,2,6,6-tetramethylpiperidinyl-NH | 56.5 |

The stabilizers of the invention are clearly superior to the controls.

EXAMPLES 13 to 17

Ethylene vinylacetate copolymer compositions were prepared using stabilizers of the invention and of the prior art, and having the following formulation:

| Ingredient | Parts by Weight |
|---|---|
| Ethylene vinylacetate copolymer | 100 |
| 2,6-di-t-butyl-p-cresol | 0.1 |
| Ca stearate | 0.1 |
| Zn stearate | 0.1 |
| Diisodecyl phenyl phosphite | 0.2 |
| Stabilizer as shown in Table III | 0.3 |

The composition was blended on a two-roll mill at 130° C, and sheets 0.4 mm thick were then compression molded at 140° C from the resulting blend. Pieces 2.5 cm square were cut off from the sheets, and exposed to ultraviolet light in a Weather-O-Meter for 500 hours. At the start and at the conclusion of the test, the tensile strength of the sheet samples was was determined. The results are given in Table III as % retention of the initially-determined tensile strength.

TABLE III

| Example No. | Stabilizer | % Retention of Tensile Strength After 500 Hours |
|---|---|---|
| Control 1 | 2-hydroxy-4-octyl benzophenone | 68 |
| Control 2 | Tris (9-aza-3-ethyl-8,8,10,10-tetramethyl-1,5-dioxa-spiro[5,5]-3-undecylmethyl)propane tricarboxylate | 71 |
| Control 3 | 2,2,6,6-tetramethyl-4-piperidinyl benzoate | 57 |

TABLE III-continued
| Example No. | Stabilizer | % Retention of Tensile Strength After 500 Hours |
|---|---|---|
| 13. | 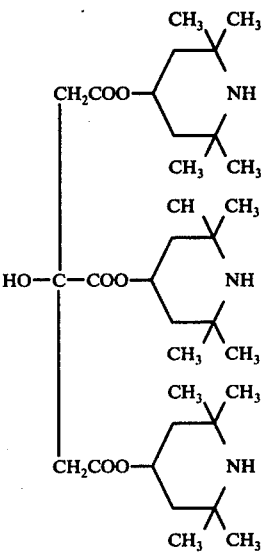 | 86 |
| 14. | 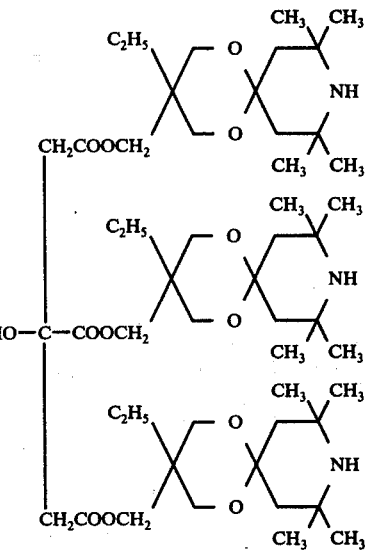 | 85 |
| 15. | 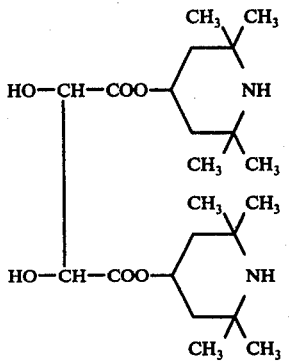 | 83 |

TABLE III-continued

| Example No. | Stabilizer | % Retention of Tensile Strength After 500 Hours |
|---|---|---|
| 16. | 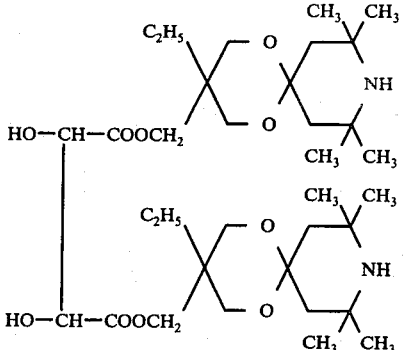 | 83 |
| 17. | 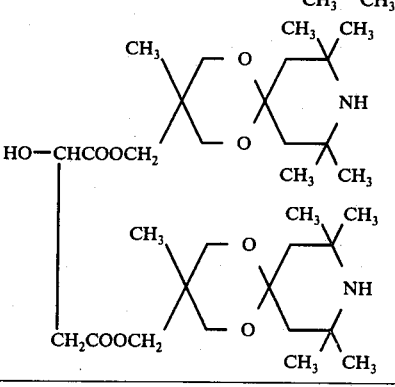 | 80 |

The stabilizers of the invention are clearly superior to the controls.

EXAMPLES 18 to 23

Polyethylene compositions were prepared using stabilizers of the invention and of prior art, having the following formulation:

| Ingredient | Parts By Weight |
|---|---|
| Polyethylene | 100 |
| Tetrakis (methylene-3-(3,5-di-t-butyl-4-hydroxyphenyl)propionate)methane | 0.1 |
| Ca stearate | 1.0 |
| Distearyl thiodipropionate | 0.3 |
| Stabilizer as shown in Table IV | 0.3 |

The composition was blended on a two-roll mill and sheets 0.5 mm thick were prepared by compression molding of the blend. Pieces 2.5 cm square were cut off from the sheets, and exposed in a Weather-O-Meter to ultraviolet light. The time in hours when degradation set in, as determined by a significant discoloration and/or embrittlement, was noted as hours to failure, and the results are reported in Table IV.

TABLE IV

| Example No. | Stabilizer | Hours to Failure |
|---|---|---|
| Control 1 | None | 490 |
| Control 2 | Phenyl salicylate | 580 |
| Control 3 | Bis (2,2,6,6-tetramethyl-4-piperdinyl) sebacate | 830 |

TABLE IV-continued
| Example No. | Stabilizer | Hours to Failure |
|---|---|---|
| 18. | 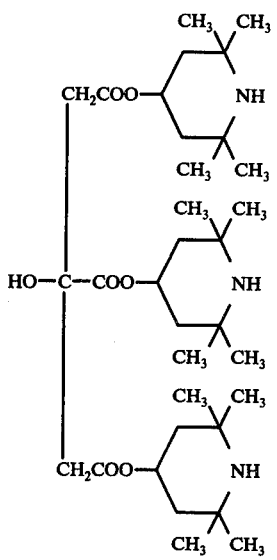 | 1530 |
| 19. | 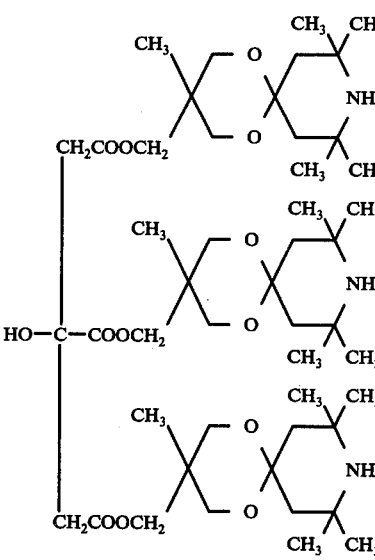 | 1390 |
| 20. | 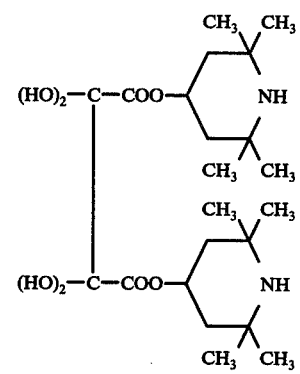 | 1360 |

TABLE IV-continued

| Example No. | Stabilizer | Hours to Failure |
|---|---|---|
| 21. | (structure: bis-ester of glycolic acid dimer with 2,2,6,6-tetramethylpiperidine) | 1410 |
| 22. | (structure: tris-ester with three 2,2,6,6-tetramethylpiperidinyl-amino groups) | 1450 |
| 23. | (structure: bis-spiro dioxa-undecyl derivative with HO—CHCOOCH₂ and CH₂COOCH₂ linkages) | 1470 |

The stabilizers of the invention are far superior to the controls, of which Control 2 is barely effective, and Control 3 only slightly more so. The stabilizers of the invention give nearly double the life of the better one, Control 2.

EXAMPLES 24 to 28

Acrylonitrile-butadiene-styrene terpolymer resin compositions were prepared, using stabilizers of the invention and of the prior art, and having the following formulation:

| Ingredient | Parts by Weight |
|---|---|
| Acrylonitrile-butadiene-styrene terpolymer | 100 |
| 4,4'-butylidene-bis(2-t-butyl-m-cresol) | 0.1 |
| Stabilizer as shown in Table V | 0.3 |

The composition was blended on a two-roll mill, and sheets 3 mm thick were prepared by compression-molding of the resulting blend. Pieces 2.5 cm square were cut off from the sheets, and subjected to ultraviolet light in a Weather-O-Meter for 800 hours. Tensile strength before and after the test exposure was determined, and the results reported as percent of tensile strength retained, at the end of this time, in Table V.

TABLE V

| Example No. | Stabilizer | % Tensile Strength Retained |
|---|---|---|
| Control 1 | 2-(2'-hydroxy-5'methylphenyl) benzotriazole | 64 |
| Control 2 | Bis (9-aza-3-ethyl-8,8,10,10-tetramethyl-1,5-dioxa-spiro[5,5]-3-undecyl methyl) succinate | 71 |
| Control 3 | 2,2,6,6-tetramethyl piperidinyl-4-glycolate | 38 |

TABLE V-continued
| Example No. | Stabilizer | % Tensile Strength Retained |
|---|---|---|
| 24. | 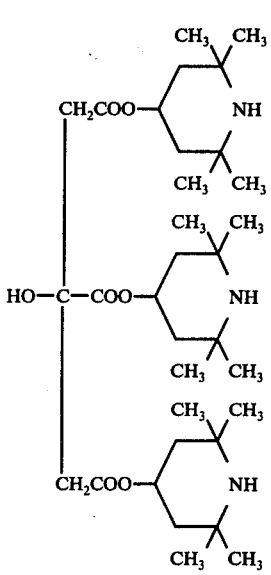 | 90 |
| 25. | 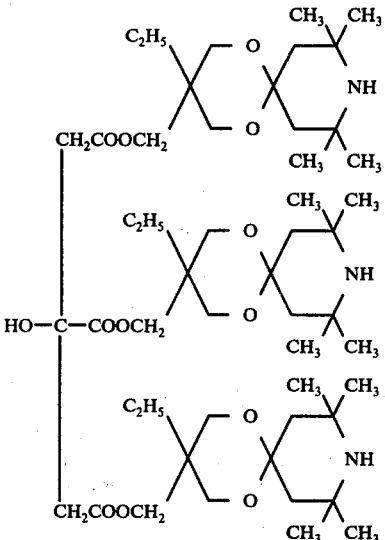 | 92 |
| 26. | 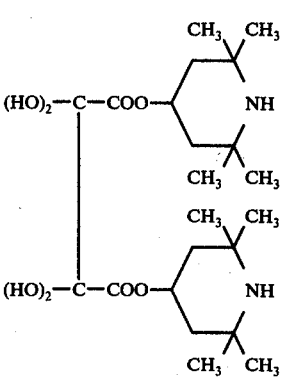 | 88 |

TABLE V-continued

| Example No. | Stabilizer | % Tensile Strength Retained |
|---|---|---|
| 27. | 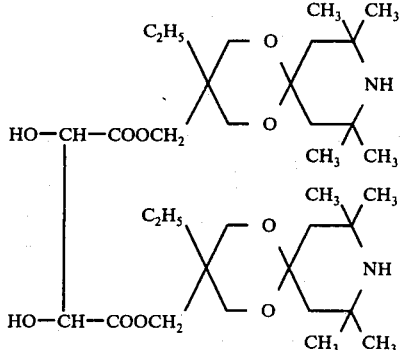 | 87 |
| 28. | 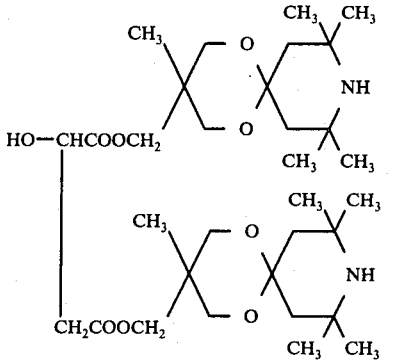 | 91 |

The stabilizers of the invention are clearly superior to the controls.

EXAMPLES 29 to 34

Polybutylene terephthalate resin compositions were prepared, using stabilizers of the invention and of the prior art, and having the following formulation:

| Ingredient | Parts by Weight |
|---|---|
| Polybutylene terephthalate | 100 |
| 1,3,5-tri-methyl-2,4,6-tris (3,5-di-t-butyl-4-hydroxybenzyl)benzene | 0.1 |
| Stabilizer as shown in Table VI | 0.2 |

The composition was blended and then injection-molded at 270° C. The test pieces were exposed to ultraviolet light in a Weather-O-Meter for 500 hours. At the start and at the conclusion of the test, the tensile strength of the test pieces was determined. The results are given in Table VI as % retention of the initially-determined tensile strength.

TABLE VI

| Example No. | Stabilizer | % Tensile Strength Retained |
|---|---|---|
| Control 1 | None | 44 |
| Control 2 | Tris (2,2,6,6-tetramethyl-4-piperidinyl) propane tricarboxylate | 55 |
| Control 3 | Bis (9-aza-3-methyl-8,8,10,10-tetramethyl-1,5-dioxa-spiro[5,5] undecyl methyl adipate | 52 |

TABLE VI-continued
| Example No. | Stabilizer | % Tensile Strength Retained |
|---|---|---|
| 29. | 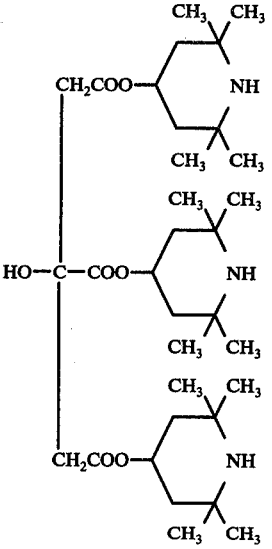 | 88 |
| 30. | 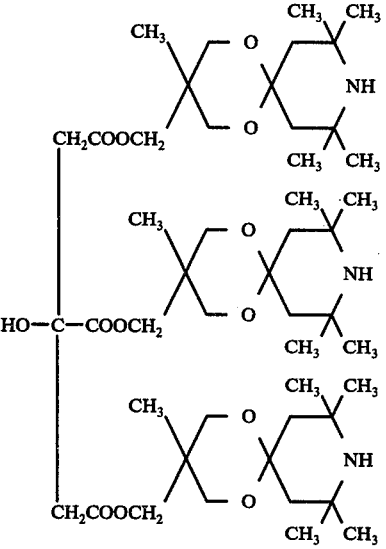 | 85 |
| 31. | 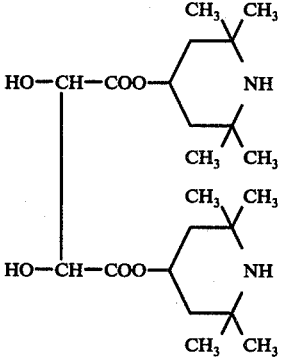 | 87 |

TABLE VI-continued

| Example No. | Stabilizer | % Tensile Strength Retained |
|---|---|---|
| 32. | [structure] | 89 |
| 33. | [structure] | 82 |
| 34. | [structure] | 88 |

The stabilizers of the invention are far superior to the controls.

The stabilizers of the invention have also been found to be effective ultraviolet light stabilizers for polyurethane resins, polycarbonates, other polyester resins, such as polyethylene terephthalate, polyphenylene, and polyamides such as polycaprolactam.

Having regard to the foregoing disclosures, the following is claimed as the inventive and patentable embodiments thereof:

1. A 2,2,6,6-tetramethyl-4-piperidyl carboxylic acid ester of an aliphatic di- or tri-carboxylic acid having the general formula:

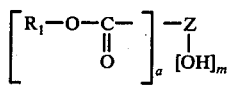   I wherein:
$R_1$ is selected from the group consisting of

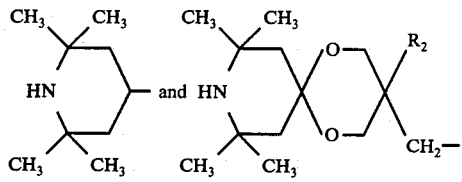

$R_2$ is $CH_3$ or $C_2H_5$;

$a$ is selected from the group consisting of 2 and 3;

$m$ is selected from the group consisting of 1, 2, 3 and 4; and

Z is a divalent or trivalent aliphatic radical having from two to about eight carbon atoms.

2. A compound according to claim 1 in which the Z radical is derived from a hydroxy substituted di- or tri-carboxylic aliphatic acid selected from the group consisting of tartaric acid, tartronic acid, malic acid, dihydroxy-tartaric acid, citric acid, 4-hydroxy-1,2,3-butane-tricarboxylic acid, citramalic acid, trihydroxy glutaric acid, tetrahydroxy adipic acid, mucic acid, saccharic acid, mannosaccharic acid, idosaccharic acid, and talomucic acid.

3. A compound according to claim 1 in which m is 1 and a is 2.

4. A compound according to claim 1 in which m is 1 and a is 3.

5. A compound according to claim 1 in which m is 2 and a is 2.

6. A compound according to claim 1 in which m is 4 and a is 2.

7. A compound according to claim 1 in which Z is alkylene having from two to three carbon atoms.

8. A compound according to claim 1 in which $R_1$ is

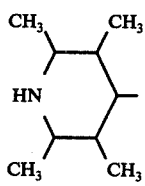

9. A compound according to claim 1 in which $R_1$ is

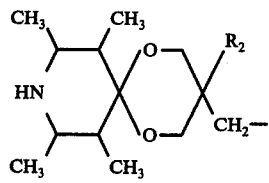

where $R_2$ is $CH_3$ or $C_2H_5$.

10. A compound according to claim 1 having the formula:

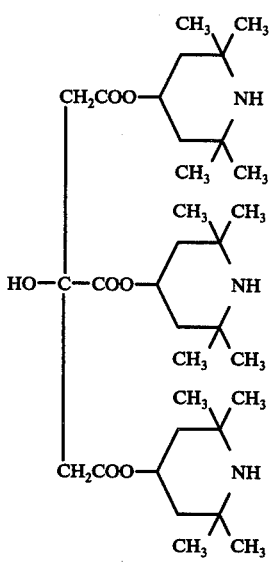

11. A compound according to claim 1 having the formula:

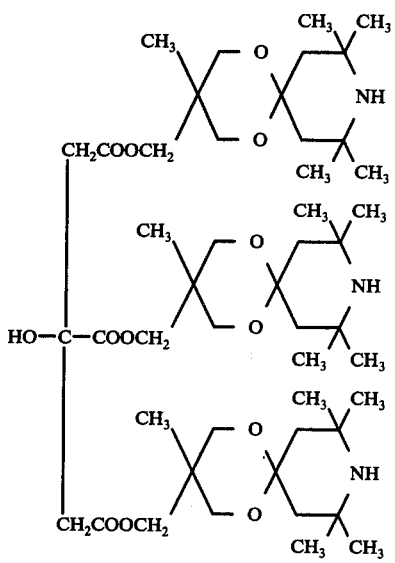

12. A compound according to claim 1 having the formula:

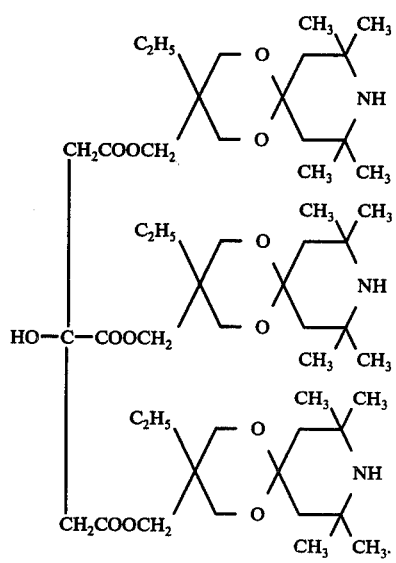

13. A compound according to claim 1 having the formula:

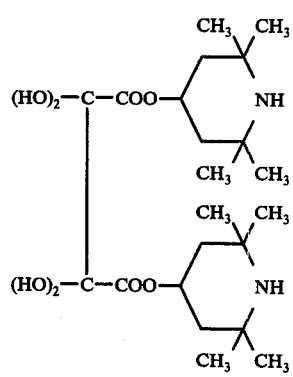

14. A compound according to claim 1 having the formula:

15. A compound according to claim 1 having the formula:

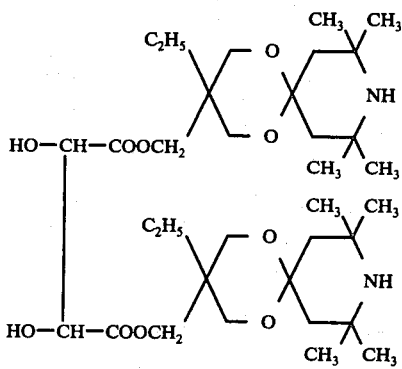

16. A polyvinyl chloride resin composition having improved resistance to deterioration when heated at 350° F, comprising a polyvinyl chloride resin formed at least in part of the recurring group:

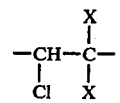

and having a chloride content in excess of 40%, where X is either hydrogen or chlorine; and a compound in accordance with claim 1.

17. A polyvinyl chloride resin composition in accordance with claim 16, in which the polyvinyl chloride resin is polyvinyl chloride homopolymer.

18. A polyvinyl chloride resin composition in accordance with claim 16, in which the polyvinyl chloride resin is a copolymer of vinyl chloride and vinyl acetate.

19. An olefin polymer composition having improved resistance to deterioration comprising an olefin polymer selected from the group consisting of polymers of alpha-olefins having from two or six carbon atoms and polystyrene, and a compound in accordance with claim 1.

20. An olefin polymer composition in accordance with claim 19, wherein the polyolefin is polypropylene.

21. An olefin polymer composition in accordance with claim 19, wherein the polyolefin is polyethylene.

22. An acrylonitrile-butadiene-styrene polymer having its resistance to deterioration when heated at 300° F and above enhanced by a compound in accordance with claim 1.

23. A polyester resin composition having improved resistance to deterioration comprising a polyester resin and a compound in accordance with claim 1.

24. An ethylene-vinyl acetate copolymer composition having improved resistance to deterioration comprising an ethylene-vinyl acetate copolymer and a compound in accordance with claim 1.

* * * * *

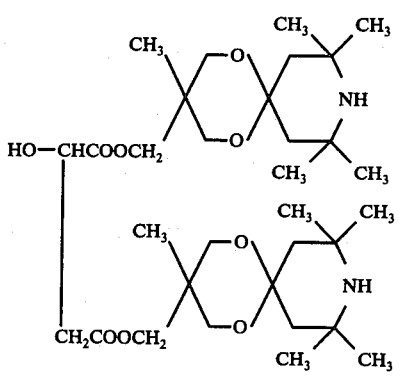

UNITED STATES PATENT AND TRADEMARK OFFICE
CERTIFICATE OF CORRECTION

PATENT NO. : 4,105,625
DATED : August 8, 1978
INVENTOR(S) : Motonobu Minagawa et al It is certified that error appears in the above-identified patent and that said Letters Patent are hereby corrected as shown below:

Column 1, line 27 : "Formula" should be --formula--.
Column 3, line 29 : "piperiodone" should be --piperidone--.
Column 6, line 14 : "Insert a period --(.)-- after "O-"
Column 8, lines 8 and 13 : "z" should be -- $Z$ --.
Column 11, line 25: Insert a --)-- after "mole".
Column 32, Table VI, Control 3, last line : Insert a --)-- after "methyl".
Column 40, line 21: "or" should be --to--

Signed and Sealed this

Eleventh Day of March 1980

[SEAL]

Attest:

SIDNEY A. DIAMOND

*Attesting Officer*     *Commissioner of Patents and Trademarks*